US010133568B2

(12) United States Patent
He et al.

(10) Patent No.: US 10,133,568 B2
(45) Date of Patent: Nov. 20, 2018

(54) EMBEDDING CODE ANCHORS IN SOFTWARE DOCUMENTATION

(71) Applicant: International Business Machines Corporation, Armonk, NY (US)

(72) Inventors: Jenny J. He, Hursley (GB); Adrian P. Kyte, Winchester (GB); Guan Jun Liu, Beijing (CN); Joseph R. Winchester, Hursley Park (GB); Bei Chun Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/252,284

(22) Filed: Aug. 31, 2016

(65) Prior Publication Data

US 2018/0060067 A1      Mar. 1, 2018

(51) Int. Cl.
*G06F 8/73*      (2018.01)
*G06F 11/36*     (2006.01)

(52) U.S. Cl.
CPC .......... *G06F 8/73* (2013.01); *G06F 11/3612* (2013.01); *G06F 11/3636* (2013.01)

(58) Field of Classification Search
CPC .......... G06F 8/71; G06F 8/73; G06F 11/3604; G06F 11/3612; G06F 11/362; G06F 11/3636
USPC ....................................................... 717/123
See application file for complete search history.

(56) References Cited

U.S. PATENT DOCUMENTS

| 6,467,080 | B1* | 10/2002 | Devine ................. G06F 9/4446 715/236 |
| 6,698,013 | B1  | 2/2004  | Bertero et al. |
| 6,993,720 | B1* | 1/2006  | Hanoch ................. G06F 9/4446 715/705 |
| 7,296,261 | B2  | 11/2007 | Witchel et al. |
| 7,490,298 | B2* | 2/2009  | Bauman ............... G06F 9/4446 715/788 |
| 2003/0093716 | A1 | 5/2003 | Farchi et al. |
| 2006/0036958 | A1* | 2/2006 | Dreher .................... G06F 9/543 715/764 |
| 2007/0266372 | A1* | 11/2007 | Gawor ....................... G06F 8/73 717/123 |
| 2008/0148235 | A1* | 6/2008 | Foresti ................. G06F 11/3604 717/123 |
| 2008/0250394 | A1* | 10/2008 | Jones ......................... G06F 8/73 717/123 |
| 2008/0256393 | A1 | 10/2008 | Shmuel |
| 2009/0210860 | A1* | 8/2009 | Sutherland ................ G06F 8/71 717/123 |
| 2010/0146340 | A1 | 6/2010 | Bhate et al. |
| 2012/0204151 | A1* | 8/2012 | Ientile ........................ G06F 8/71 717/121 |

(Continued)

*Primary Examiner* — Jason D Mitchell
(74) *Attorney, Agent, or Firm* — Cantor Colburn LLP; William A. Kinnaman, Jr.

(57) ABSTRACT

Techniques are provided for performing automated operations to support the identification of software documentation in need of updating. Application screen shots or other documentation anchors are generated having metadata regarding the application source code that is executing or recently executed. When the application software is updated, code path metadata is compared with source code changes to identify areas of documentation that may need updating.

14 Claims, 3 Drawing Sheets

(56) References Cited

U.S. PATENT DOCUMENTS

| | | | | |
|---|---|---|---|---|
| 2012/0272207 A1* | 10/2012 | Lerner | ............... | G06F 8/30 |
| | | | | 717/102 |
| 2012/0278903 A1* | 11/2012 | Pugh | ............... | G06F 21/604 |
| | | | | 726/28 |
| 2013/0061209 A1* | 3/2013 | Lam | ............... | G06F 11/3672 |
| | | | | 717/123 |
| 2014/0013304 A1* | 1/2014 | Vangala | ............... | G06F 8/75 |
| | | | | 717/123 |
| 2014/0019937 A1* | 1/2014 | Clark | ............... | G06F 8/73 |
| | | | | 717/123 |
| 2014/0173555 A1* | 6/2014 | Ng | ............... | G06F 8/30 |
| | | | | 717/109 |
| 2014/0181626 A1* | 6/2014 | Feltham | ............... | G06F 17/211 |
| | | | | 715/203 |
| 2014/0181705 A1* | 6/2014 | Hey | ............... | G06F 3/048 |
| | | | | 715/764 |
| 2014/0223416 A1* | 8/2014 | Cohen | ............... | G06F 11/3476 |
| | | | | 717/123 |
| 2014/0289705 A1* | 9/2014 | Lu | ............... | G06F 8/75 |
| | | | | 717/123 |
| 2015/0268939 A1* | 9/2015 | Kelapure | ............... | G06F 8/40 |
| | | | | 717/112 |
| 2016/0011868 A1* | 1/2016 | Frenkiel | ............... | G06F 8/73 |
| | | | | 717/123 |
| 2017/0109159 A1* | 4/2017 | Archer | ............... | G06F 8/73 |

* cited by examiner

EMBEDDING CODE ANCHORS IN SOFTWARE DOCUMENTATION

BACKGROUND

This disclosure relates to articles, methods, and systems to perform automated operations for facilitating the generation and revision of documentation related to software, operating systems, or other systems comprising executable software instructions.

In particular, techniques are described herein to create and maintain software documentation that includes references to particular portions of executable software. When software is modified subsequent to the creation of documentation related to that software, the documentation itself may become outdated or even obsolete because the functionality of the software described in the documentation has been modified, enhanced, or removed. Such described functionality may, depending on the particular documentation, include both textual and graphical components, such as screen captures of particular elements of a graphical user interface presented by the related software.

SUMMARY

According to at least one embodiment, a method implemented by one or more computing systems configured to facilitate generation and revision of software documentation comprises initiating monitoring execution of a software application having a plurality of software modules; receiving a user instruction to insert a code anchor in a first portion of documentation related to the software application; identifying, responsive to receiving the user instruction, a first subset of the plurality of software modules being executed at the first time; and modifying one or more files comprising the first portion of documentation to include a code anchor associated with the identified subset of software modules.

According to another embodiment, a non-transitory computer-readable storage medium has stored contents that, when executed, configure a computing system to perform a method to facilitate generation and revision of software documentation. The method comprises initiating monitoring execution of a software application having a plurality of software modules; receiving a user instruction to insert a code anchor in a first portion of documentation related to the software application; identifying, responsive to receiving the user instruction, a first subset of the plurality of software modules being executed at the first time; and modifying one or more files comprising the first portion of documentation to include a code anchor associated with the identified subset of software modules.

According to another embodiment, a system to facilitate generation and revision of software documentation comprises one or more processors and at least one memory that includes instructions that, upon execution by a processor, cause the computing system to perform a method. The method includes initiating monitoring execution of a software application having a plurality of software modules; receiving a user instruction to insert a code anchor in a first portion of documentation related to the software application; identifying, responsive to receiving the user instruction, a first subset of the plurality of software modules being executed at the first time; and modifying one or more files comprising the first portion of documentation to include a code anchor associated with the identified subset of software modules.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Figure 1:
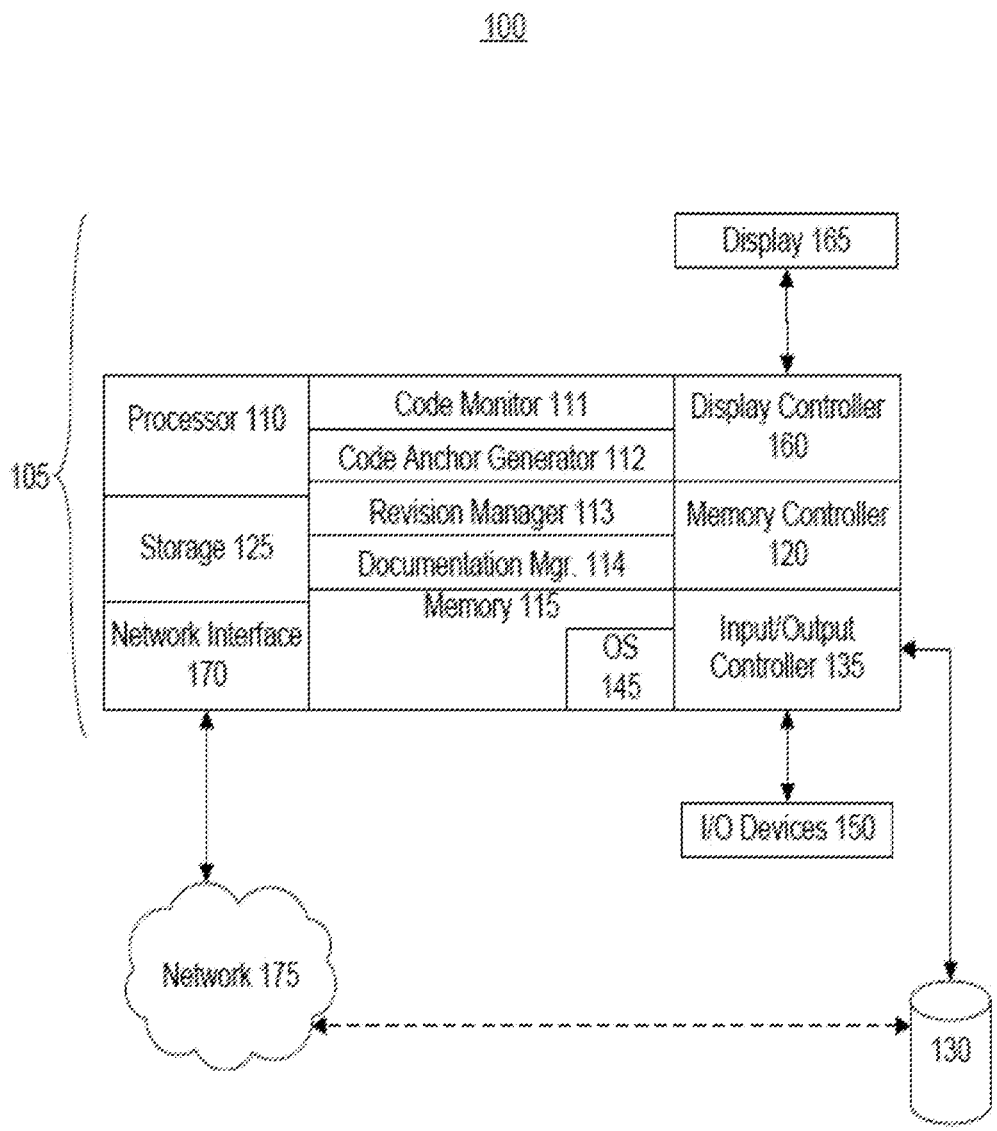
FIG. 1 depicts a block diagram of an exemplary network environment and computing system in accordance with an embodiment.

In at least certain embodiments of techniques described herein, during preparation of software documentation, a code anchor may be generated and embedded within a particular portion of that software documentation in order to create and/or visually represent an association between that particular portion of documentation and the software code that has been executed (or is being executed) at the time the code anchor is generated.

As used herein, the term "code" refers to any executable software instructions, such as instructions comprising (as non-limiting examples) software applications, firmware, operating system modules, etc. The term "code anchor," also as used herein, may refer to any data structure that may be embedded at a particular position within one or more documents and that includes metadata referencing one or more particular sections or modules of code. Also as used herein, the term "screenshot" may include any captured portion of displayed elements, such as of a graphical user interface and/or surrounding display area.

One non-exclusive example of a "code anchor" as used herein is a graphical image, such as a graphical image generated by capturing one or more elements of a graphical user interface presented by the software application. In other embodiments and scenarios, a code anchor may be generated and embedded in a portion of the software documentation without capturing any portion of a graphical user interface, such as if the user wishes to generate an anchor between the portion of the software documentation and particular functionality of the related software application without actually including a screenshot within the documentation. In such embodiments and scenarios, a graphical icon or other representation of the code anchor may be included in the documentation when displayed to the author or other authorized users, but may not be displayed within that documentation when presented to an end user (i.e., reader).

In certain embodiments, a user creating documentation related to a software application uses a Code Documentation Management (CDM) System in accordance with techniques described herein to monitor the related software application during execution and manage the creation and use of code anchors within the documentation based on such monitoring.

For example, as part of documenting particular features and functionality of the software application, the user may capture various screenshots to illustrate such features and functionality. The user may start the software application, capture an image of the welcome screen to embed within the documentation, and write about that welcome screen; might run a "wizard" provided by the software application and similarly document that wizard; launch a separate application view and similarly document the separate application view, and so forth.

While the software application runs, the CDM system code monitor analyzes which modules are being loaded and which statements are being executed. In certain embodiments, the CDM system collects such information in a database storing timestamps with executing modules/statements. As code anchors are generated by the CDM system, metadata associated with those code anchors are recorded in the database, together with the chapters of the documentation being edited.

In at least one embodiment, the CDM system detects and/or facilitates the capturing of screenshots as such capture is initiated by the user, monitors execution of the software application to determine code coverage data, and record some or all code modules executed as part of a graphical user interface element being presented. In at least some embodiments, the CDM system creates a map of code modules executed before a screen is presented to the user. Based on such information, the CDM system generates metadata to include with the embedded screenshot as a code anchor. In this manner, the embedded screenshot serves as a link between a portion of documentation and particular code executed as part of presenting the GUI elements within that screenshot.

When portions of the software application are later changed, an information delta mapping may be created regarding code modules from the version used during creation of the last known valid documentation. This information delta mapping indicates areas of the code that have been affected in the new release. By comparing this against the code modules in the paths when the original documentation is created, the CDM system may determine those portions of the documentation that are most likely in need of modification.

At the end of the documentation process, the database thus includes a record of which code modules were being executed during the course of a portion of that documentation being written. For example, assume that a software application being documented is displaying at time T1 a first GUI screen A1. In order to document a particular feature of the software application, the user initiates controls of the software application to display a second GUI screen A2 at time T2, upon which the user writes several pages of documentation and possibly embeds a screenshot of GUI screen A2. In at least one embodiment, the CDM system may determine that the code modules executed between T1 and T2 are now associated with that piece of the documentation—for example, the documentation could be describing how to navigate from A1 to A2. By incorporating metadata associated with those code modules executed between T1 and T2 into the screenshot, the CDM system provides a code anchor to record such association.

At a later time, when a new release or version of the software application is created, the user may need to know what documentation might be affected. In at least some embodiments, the CDM system generates an information delta mapping of which modules have changed from the application version associated with the original documentation. Based on the information delta mapping, the CDM system may correlate it with the code coverage and documentation map database and provide an indication to the user of those areas that are most likely to be affected. For example, in the case of a GUI screen, if the code modules executing just prior to the opening of the GUI screen have been modified, the CDM system may determine a high likelihood that the portion of documentation related to those code modules—and therefore containing one or more code anchors referencing those code modules—may be in need of revision.

In certain embodiments, the CDM system may generate a "heat map" of particular portions of documentation most and least likely affected by code changes based on an analysis of the information delta mapping, and may provide the heat map to the user. In this manner, the user may target efforts to ensure that the documentation is maintained in accordance with the new version of the software application. Portions of the documentation containing code anchors that reference one or more software modules that have changed greatly since those portions were created are more likely to be affected than modules in which no code has changed, or modules in which fewer modifications have been recorded. By using the code coverage code path indicated by the information delta mapping generated by the CDM system (as opposed to a simple module bytecode comparison), a user may learn the execution paths that affect the software documentation, providing greater recognition regarding particular portions of the documentation on which to focus.

In embodiments and scenarios in which a screen capture is used as an embedded code anchor, a mapping between documentation and code may provide a clear visual indication of such connection. However, in certain embodiments and scenarios, a code anchor may be embedded in one or more portions of documentation without requiring insertion of that code anchor in a manner visible to an end reader. For example, an author user may utilize the CDM system to insert a code anchor that includes metadata referencing a point in time when the author user has completed a portion of documentation regarding particular software application functionality. In certain embodiments, such a code anchor may be visually represented for the author user when generating the documentation (such as by a graphical icon or other visual indicia), but in a manner that is not reproduced for an end reader of the documentation, either in print or other version.

FIG. 1 illustrates a block diagram of an exemplary CDM computing system 100 for use in practicing the teachings herein. The methods described herein can be performed or otherwise implemented via hardware, software (e.g., firmware), or combination thereof. In an exemplary embodiment, the methods described herein are implemented in hardware, and may be part of the microprocessor of a special or general-purpose digital computer, such as a personal computer, workstation, minicomputer, or mainframe computer. The CDM computing system 100 therefore includes computer 105.

In the illustrated embodiment of FIG. 1, the computer 105 includes a processor 110, a code monitoring module 111, a code anchor generator 112, a revision manager module 113, a documentation manager module 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the processor 110 is a hardware device for executing hardware instructions or software, particularly that stored in memory 115. The processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 2:
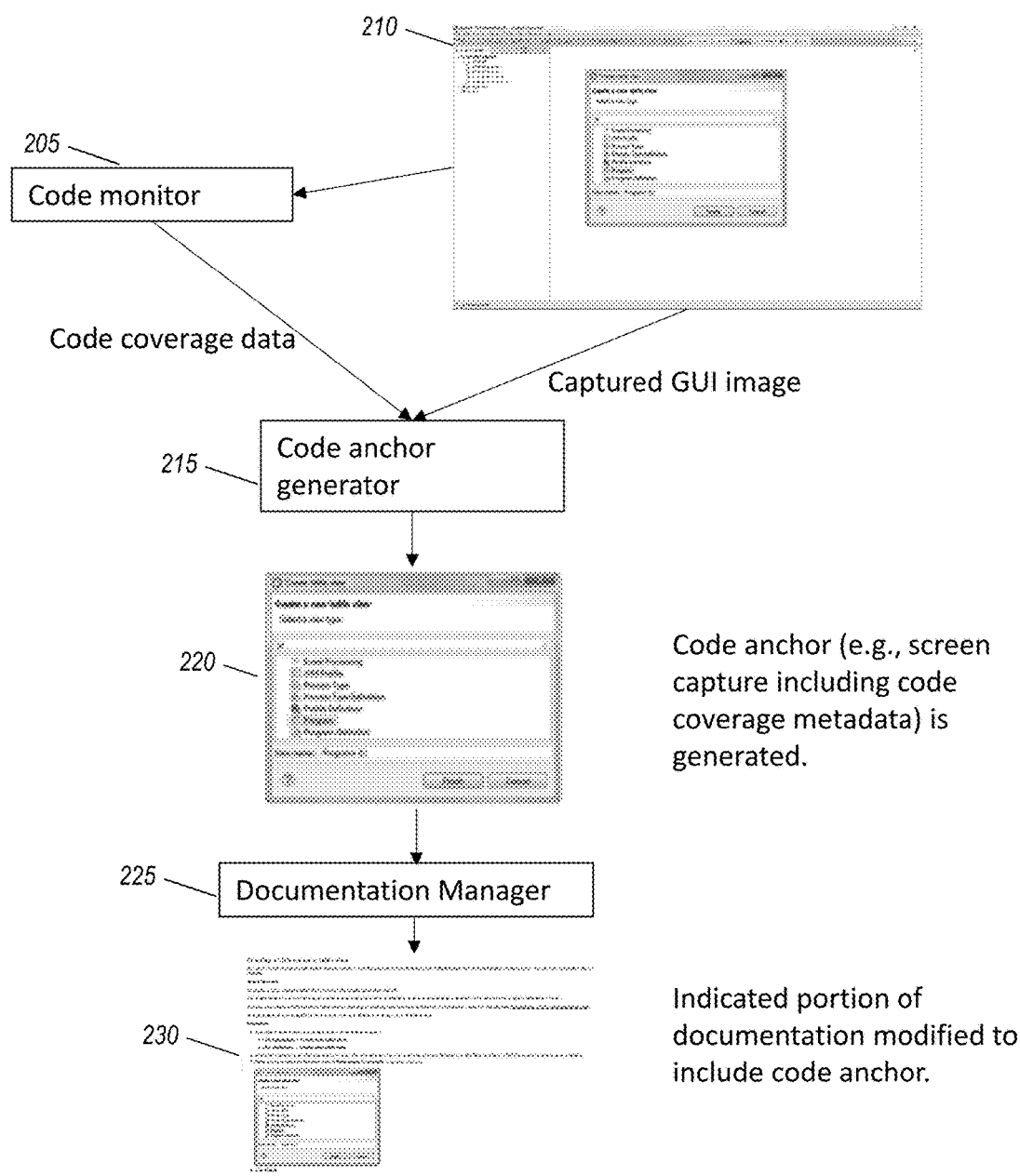
FIG. 2 depicts a process flow for generating and embedding a code anchor in documentation related to a software application in accordance with techniques described herein.

FIG. 2 depicts a process flow for generating and embedding a code anchor in software documentation related to a software application in accordance with an embodiment of techniques described herein. The process begins at block 205 when a code monitor module of an exemplary CDM system (such as code monitor module 111 of FIG. 1) detects a screen capture 210 of GUI elements presented by a software application that is being monitored by the code monitor module. In block 215, code coverage data provided by the code monitor 205 and the screen capture 210 are provided to a code anchor generator of the exemplary CDM system (such as code anchor generator 112 of FIG. 1). In block 220, the code anchor generator generates a code anchor that includes an image capture of some or all of the presented GUI elements as well as code coverage metadata referencing portions of the monitored software application that are executing (or recently executed) at the time the screen capture was detected. In block 225, the code anchor generator provides the generated code anchor to a documentation manager module of the exemplary CDM system (such as documentation manager module 114 of FIG. 1). In block 230, the documentation manager module modifies the software documentation to include the generated code anchor at a position indicated by the user (e.g., at a position indicated by a current insertion cursor).

Figure 3:
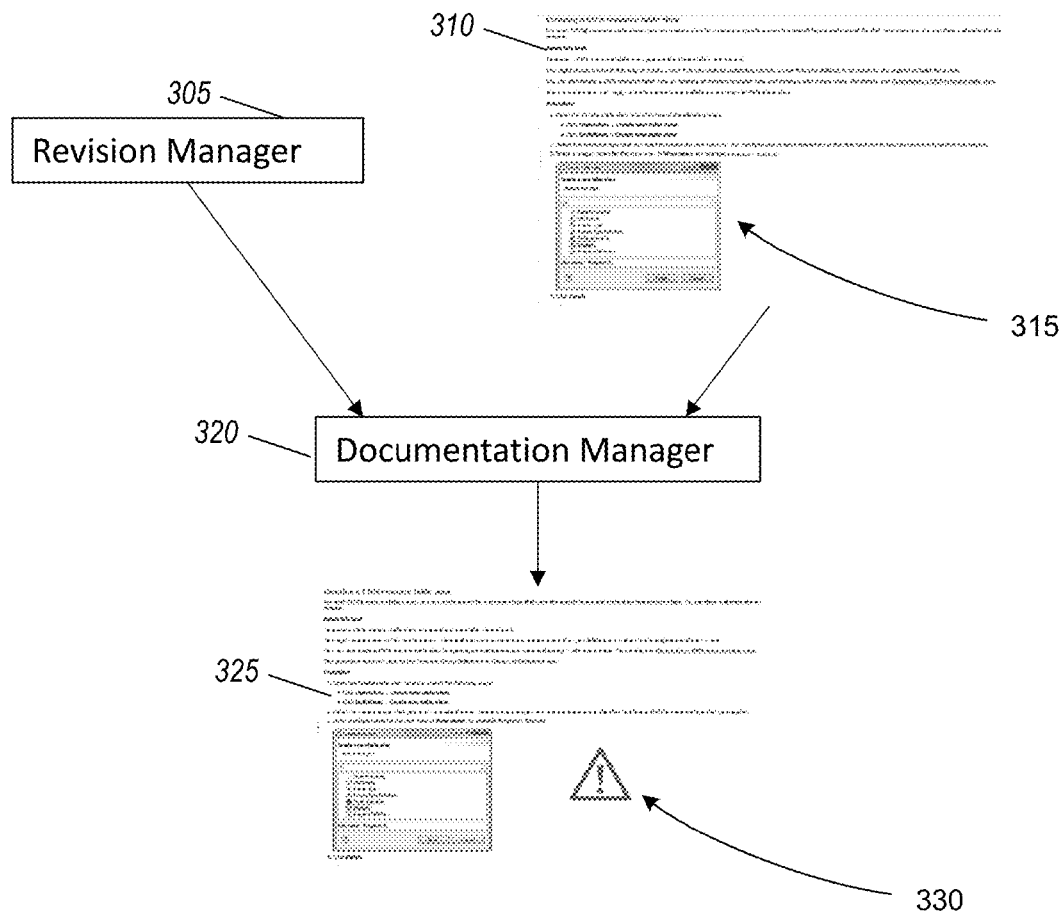
FIG. 3 depicts a process flow for managing documentation revision based on one or more embedded code anchors in accordance with techniques described herein.

FIG. 3 depicts a process flow for managing documentation revision based on one or more embedded code anchors in accordance with an embodiment of techniques described herein. The process begins at block 305 when a revision manager module of an exemplary CDM system (such as revision manager module 113 of FIG. 1) identifies one or more code revisions within a software application associated with related software documentation 310. In the depicted embodiment, the software documentation 310 includes an embedded code anchor 315, such as may have been embedded as a result of the process depicted in FIG. 2. In block 320, the revision manager module provides information indicative of the identified code revisions to a documentation manager module of the exemplary CDM system (such as documentation manager module 114 of FIG. 1), which searches for code coverage data in the software documentation 310.

As a result of its search for the code coverage data, the documentation manager identifies the embedded code anchor 315 within the software documentation 310, and in block 325 provides an indication 330 (based on the information passed from the revision manager module) that the portion of the software documentation that includes the code anchor 315 may need to be revised based on code revisions made to particular modules of the software application that are associated with the code anchor. In the depicted embodiment, the documentation manager modifies the relevant portion of documentation to include a graphical alert icon in order to alert a user tasked with revising the software documentation. In other embodiments, the documentation manager may use any other appropriate manner to notify the user.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for facilitating generation and revision of software documentation, the method comprising:
    initiating, by one or more computing systems configured to facilitate generation and revision of software documentation, monitoring execution of a software application having a plurality of software modules;
    receiving, by the one or more computing systems at a first time, a user instruction to insert a code anchor in a first portion of documentation related to the software application;
    identifying, by the one or more computing systems and responsive to receiving the user instruction, a first subset of the plurality of software modules comprising a code coverage code path of software modules being executed at the first time; and
    modifying, by the one or more computing systems, one or more files comprising the first portion of documentation to include a code anchor associated with the first subset of software modules;
    recording an association between the first subset of software modules and the first portion of related documentation;
    receiving, at a second time that is later than the first time, an indication that one or more modules of the software application have been modified;
    determining that the modified modules include at least one of the first subset of software modules; and
    responsive to receiving the indication that the one or more modules of the software have been modified, and based at least in part on the recorded association between the first subset of software modules and the first portion of documentation, providing an indication that the first portion of documentation may need to be modified in accordance with one or more changes to the at least one software module.

2. The computer-implemented method of claim 1 wherein the code anchor comprises a graphical image.

3. The computer-implemented method of claim 1 wherein generating the code anchor associated with the first subset of software modules includes generating an image for insertion within the related document by capturing at least a portion of a graphical user interface presented by the software application at the first time.

4. The computer-implemented method of claim 1 wherein receiving the user instruction to insert the code anchor includes receiving an indication that the user has captured an image of at least a portion of a graphical user interface of the software application, and wherein generating the code anchor includes recording an association between the captured image and the first subset of software modules.

5. The computer-implemented method of claim 1, wherein receiving the indication at the second time includes receiving one or more indications that multiple modules of the software application have been modified, wherein the multiple modified modules are associated with distinct portions of the documentation, and wherein providing the indication that the first portion of documentation may need to be modified includes providing, based at least in part on receiving the one or more indications that multiple modules have been modified, an indication of a relative likelihood that the first portion of documentation needs modifying.

6. A non-transitory computer-readable medium having stored contents that, when executed, configure a computing system to perform a method to facilitate generation and revision of software documentation, the method comprising:
    initiating, by the computing system, monitoring execution of a software application having a plurality of software modules;
    receiving, by the computing system at a first time, a user instruction to insert a code anchor in a first portion of documentation related to the software application;
    identifying, by the computing system and responsive to receiving the user instruction, a first subset of the plurality of software modules comprising a code coverage code path of software modules being executed at the first time;
    modifying, by the computing system, one or more files comprising the first portion of documentation to include a code anchor associated with the first subset of software modules;
    recording an association between the first subset of software modules and the first portion of related documentation;
    receiving, at a second time that is later than the first time, an indication that one or more modules of the software application have been modified;
    determining that the modified modules include at least one of the first subset of software modules; and
    responsive to receiving the indication that the one or more modules of the software have been modified, and based at least in part on the recorded association between the first subset of software modules and the first portion of documentation, providing an indication that the first portion of documentation may need to be modified in accordance with one or more changes to the at least one software module.

7. The non-transitory computer-readable medium of claim 6 wherein the code anchor comprises a graphical image.

8. The non-transitory computer-readable medium of claim 6 wherein generating the code anchor associated with the first subset of software modules includes generating an image for insertion within the related document by capturing at least a portion of a graphical user interface presented by the software application at the first time.

9. The non-transitory computer-readable medium of claim 6 wherein receiving the user instruction to insert the code anchor includes receiving an indication that the user has captured an image of at least a portion of a graphical user interface of the software application, and wherein generating the code anchor includes recording an association between the captured image and the first subset of software modules.

10. The non-transitory computer-readable medium of claim 6, wherein receiving the indication at the second time includes receiving one or more indications that multiple modules of the software application have been modified, wherein the multiple modified modules are associated with distinct portions of the documentation, and wherein providing the indication that the first portion of documentation may need to be modified includes providing, based at least in part on receiving the one or more indications that multiple modules have been modified, an indication of a relative likelihood that the first portion of documentation needs modifying.

11. A system to facilitate generation and revision of software documentation, comprising:
one or more processors; and
at least one memory, the memory including instructions that, upon execution by at least one of the one or more processors, cause the system to perform a method that includes:
initiating monitoring execution of a software application having a plurality of software modules;
receiving, at a first time, a user instruction to insert a code anchor in a first portion of documentation related to the software application;
identifying, responsive to receiving the user instruction, a first subset of the plurality of software modules comprising a code coverage code path of software modules being executed at the first time;
modifying one or more files comprising the first portion of documentation to include a code anchor associated with the first subset of software modules;
recording an association between the first subset of software modules and the first portion of related documentation;
receiving, at a second time that is later than the first time, an indication that one or more modules of the software application have been modified;
determining that the modified modules include at least one of the first subset of software modules; and
responsive to receiving the indication that the one or more modules of the software have been modified, and based at least in part on the recorded association between the first subset of software modules and the first portion of documentation, providing an indication that the first portion of documentation may need to be modified in accordance with one or more changes to the at least one software module.

12. The system of claim 11 wherein generating the code anchor associated with the first subset of software modules includes generating an image for insertion within the related document by capturing at least a portion of a graphical user interface presented by the software application at the first time.

13. The system of claim 11 wherein receiving the user instruction to insert the code anchor includes receiving an indication that the user has captured an image of at least a portion of a graphical user interface of the software application, and wherein generating the code anchor includes recording an association between the captured image and the first subset of software modules.

14. The system of claim 11, wherein receiving the indication at the second time includes receiving one or more indications that multiple modules of the software application have been modified, wherein the multiple modified modules are associated with distinct portions of the documentation, and wherein providing the indication that the first portion of documentation may need to be modified includes providing, based at least in part on receiving the one or more indications that multiple modules have been modified, an indication of a relative likelihood that the first portion of documentation needs modifying.

* * * * *